United States Patent
Tognelli

[11] Patent Number: 5,698,058
[45] Date of Patent: Dec. 16, 1997

[54] MINERAL WOOL PANEL AND METHOD FOR ITS CONSTRUCTION

[75] Inventor: Giorgio Tognelli, Verderio Superiore, Italy

[73] Assignee: Metecno S.P.A., Tribano, Italy

[21] Appl. No.: 564,266

[22] PCT Filed: May 8, 1995

[86] PCT No.: PCT/EP95/01736

§ 371 Date: Dec. 27, 1995

§ 102(e) Date: Dec. 27, 1995

[87] PCT Pub. No.: WO95/31331

PCT Pub. Date: Nov. 23, 1995

[30] Foreign Application Priority Data

May 18, 1994 [IT] Italy ................... VE94A0023

[51] Int. Cl.[6] ........................................... B32B 31/00
[52] U.S. Cl. .................. 156/259; 156/265; 156/266; 156/304.1; 156/512; 428/74
[58] Field of Search ................ 428/74, 56; 156/259, 156/265, 266, 512, 304.1

[56] References Cited

U.S. PATENT DOCUMENTS

| 5,073,426 | 12/1991 | Blaauw | 428/76 |
| 5,313,758 | 5/1994 | Willman | 428/74 |
| 5,328,739 | 7/1994 | Heselius et al. | 428/76 |

FOREIGN PATENT DOCUMENTS

| 0396306 | 11/1990 | European Pat. Off. |
| 1572045 | 6/1969 | France |
| 2503123 | 7/1976 | Germany |
| 90/07040 | 6/1990 | WIPO |

*Primary Examiner*—Alexander Thomas
*Attorney, Agent, or Firm*—Hoffman, Wasson & Gitler

[57] ABSTRACT

A mineral wool panel including at least one covering sheet supporting a mineral wool blanket which has a plurality of side-by-side strips wherein their longitudinal axis is parallel to the panel axis and their fibers are oriented perpendicular to the surface of the covering sheet, and further the strips are offset in accordance with a pseudo-random arrangement.

12 Claims, 7 Drawing Sheets

MINERAL WOOL PANEL AND METHOD FOR ITS CONSTRUCTION

This invention relates to a mineral wool panel and a method for its construction.

Sandwich panels used for constructing walls and/or roofs of buildings are known. These known panels consist of two flat or fretted metal sheets between which a layer of insulating material, generally mineral wool with orientated fibres, is interposed.

The insulating material is introduced between the metal sheets generally in the form of side-by-side strips with their longitudinal axis perpendicular to the longitudinal axis of the panel and with the fibres orientated perpendicular to the sheet surface.

In other cases the covering sheets can be of plastics, textile, paper or wooden material, and in further cases only one covering sheet is provided.

These known panels have however certain drawbacks, and in particular:

a low mechanical bending strength due to the presence of discontinuities in the longitudinal direction of the filling, non-ideal utilisation of the anisotropic characteristics of the material.

Again, introducing the insulating material in the form of side-by-side strips with their longitudinal axis parallel to the panel axis has the drawback of longitudinal discontinuity, whether the configuration is one in which they have a common transverse front or one in which they are offset in a stepped arrangement.

An object of the invention is to obviate these drawbacks by providing a method for constructing panels, substantially similar to the aforesaid, which have good transverse rigidity so as to support the tangential forces when subjected to bending stress.

A further object of the invention is to provide a method which can be implemented continuously or discontinuously, and automatically or non-automatically.

These and further objects which will be apparent from the ensuing description. The invention relates to a mineral wool panel including at least one covering sheet supporting a mineral wool blanket, the mineral wool blanket has a plurality of side-by-side strips with their longitudinal axis being parallel to a mineral wool panel axis and the fibers of the side-by-side strips being oriented perpendicular to the surface of the covering sheet, wherein the strips are offset in accordance with one another in accordance with a pseudo-random arrangement.

The mineral wool panel is formed by a process which includes longitudinally cutting the mineral wool blanket to form a plurality of series of side-by-side strips having their fibers horizontal and arranged transverse to their longitudinal axis, advancing the series of side-by-side strips in a direction transverse to their longitudinal axis and rotating the individual strips of the series through 90°, wherein the first series of strips is provided spaced apart in a direction parallel to their direction of advancement and the spaced apart strips are advanced in a direction parallel to their longitudinal axis. The front ends of the strips are longitudinally offset, the strips are then laterally compacted, the strips are then fixed to the covering sheet, and then a second series of strips are brought into rearward abutment by advancing them against the first series of strips.

BRIEF DESCRIPTION OF THE DRAWINGS

The present invention is further clarified hereinafter with reference to the accompanying drawings, in which.

DETAILED DESCRIPTION OF THE PREFERRED EMBODIMENTS

Figure 1:
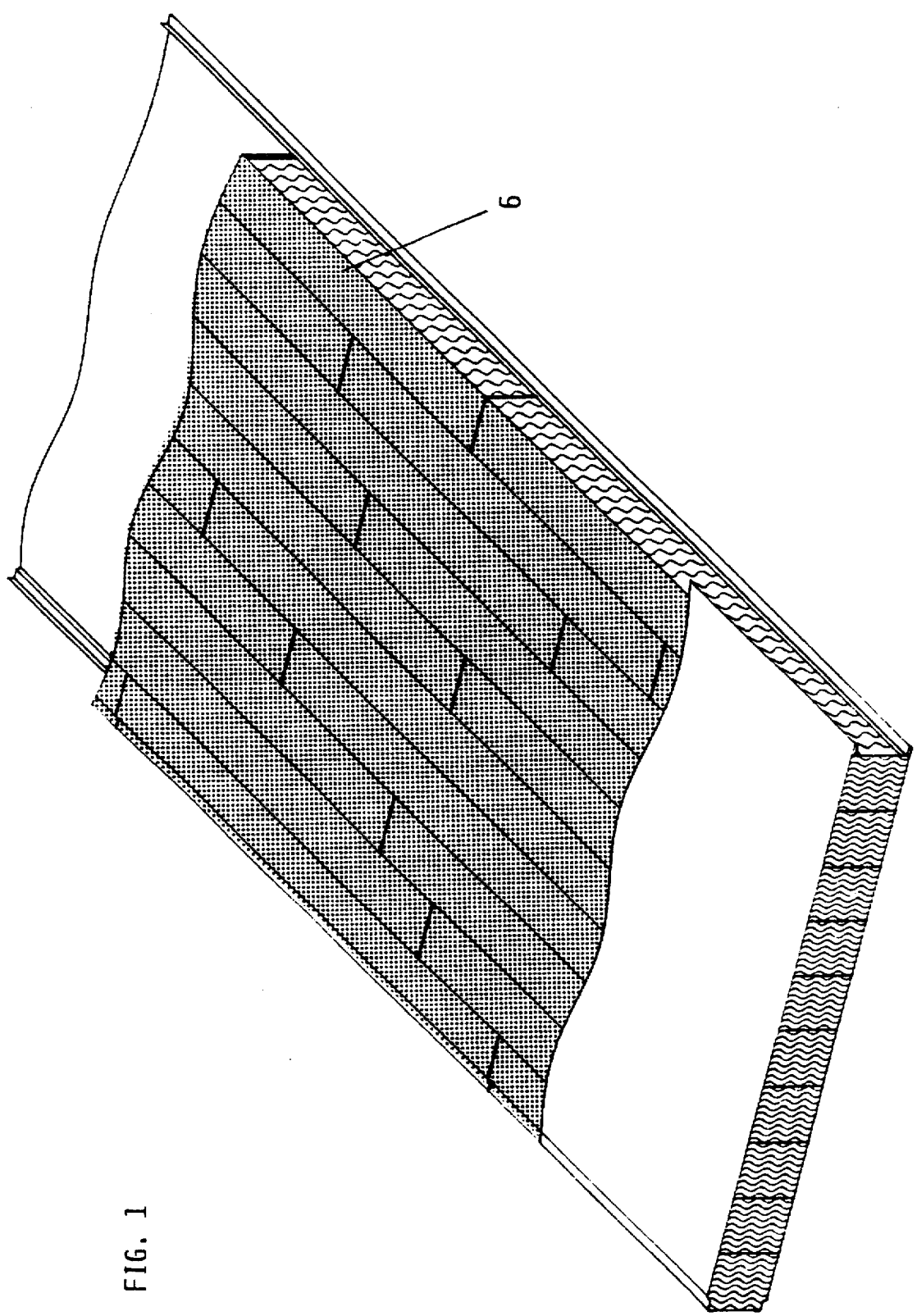
FIG. 1 is a perspective view of a panel according to the invention partly without its upper metal sheet.
Figure 2:
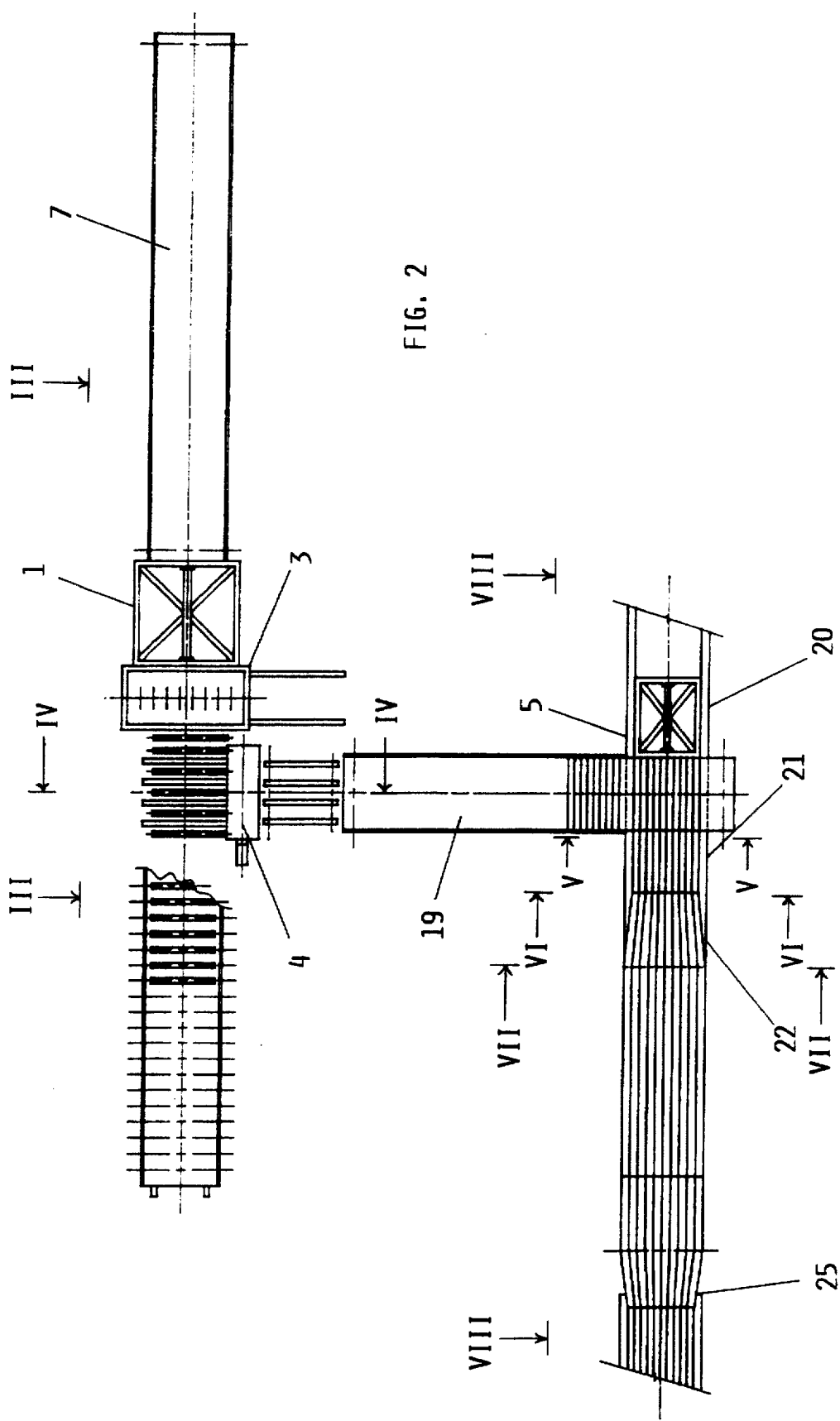
FIG. 2 is a plan view of a plant for continuously constructing the panel of FIG. 1.
Figure 3:
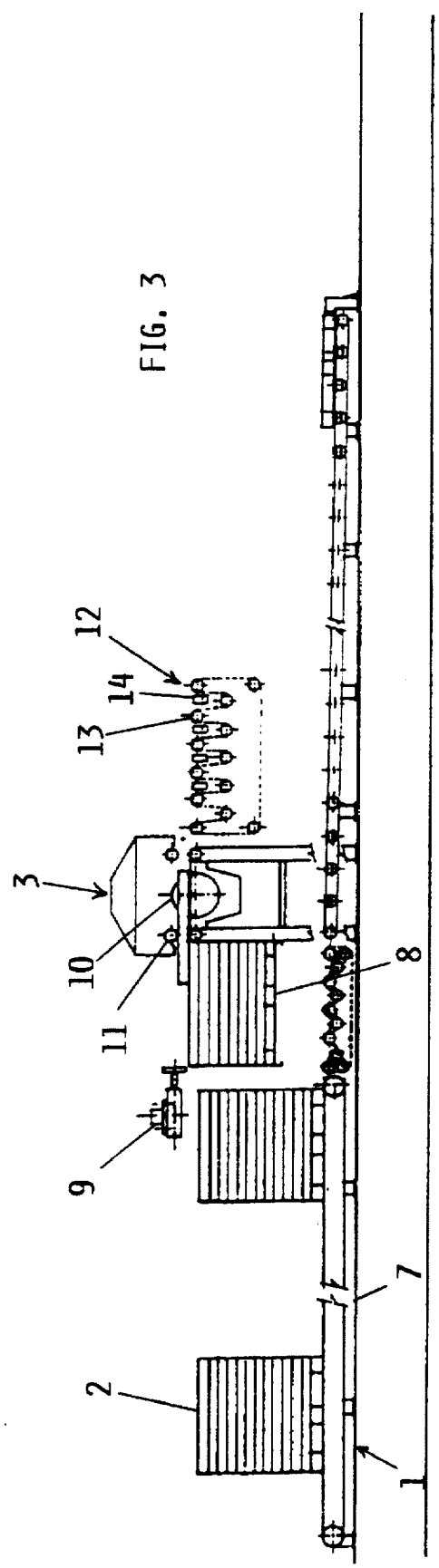
FIG. 3 is an enlarged view thereof taken on the line III—III of FIG. 2.
Figure 4:
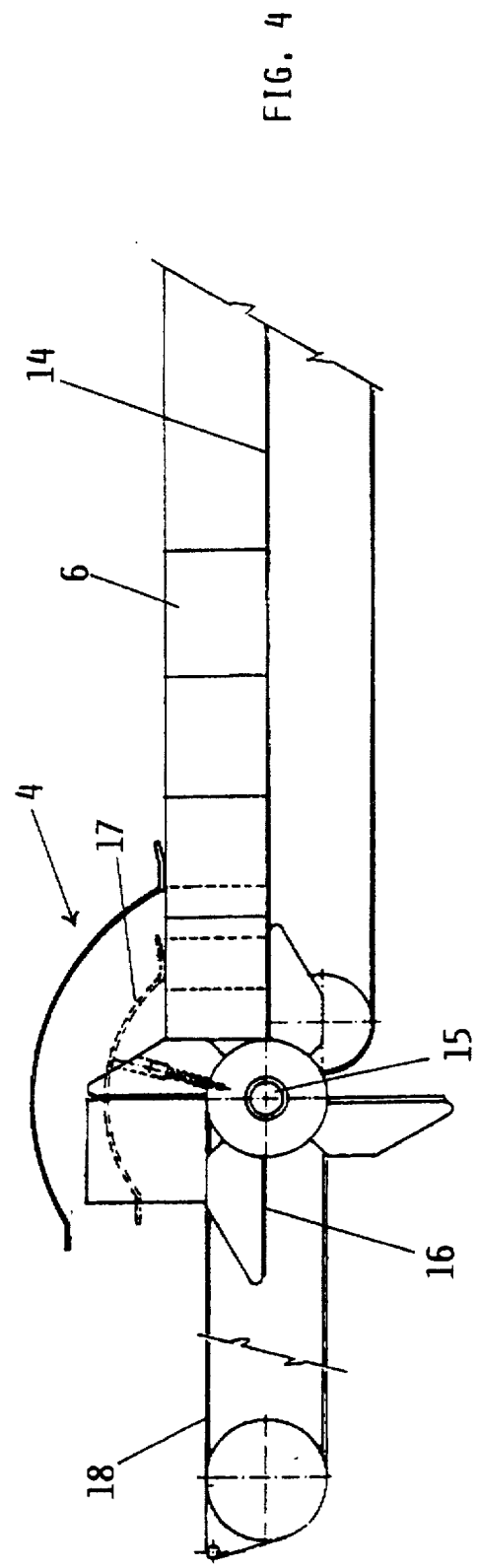
FIG. 4 is an enlarged cross-section therethrough on the line IV—IV of FIG. 2.
Figure 5:
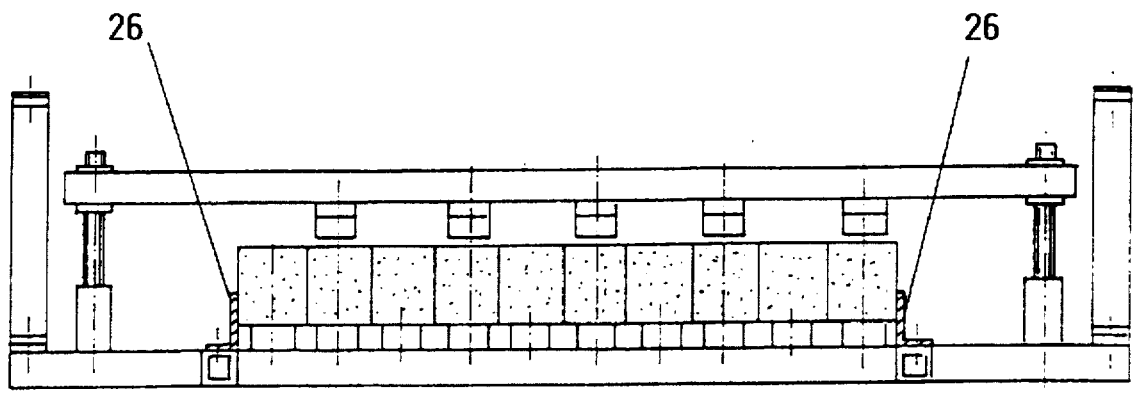
FIG. 5 is an enlarged section therethrough on the line V—V of FIG. 2.

As can be seen form the figures, the plant for constructing the panel according to the invention comprises substantially:

a feed station 1 for mineral wool blankets, a cutting unit 3, an overturning unit 4, a station 5 for assembling the strips 6 leaving the overturning unit 4, and a station for pseudo-randomly distributing the strips.

The station 1 comprises a belt conveyor 7 for transferring piles of blankets to an elevator table 8, at the upper end-of-travel position of which there is provided a pneumatic pusher 9. The cutting unit 3 consists of a multiple circular bladed saw 10 mounted on a shaft of horizontal axis, and a roller advancement system 11. In other cases the advancement system can consist of a belt conveyor.

Downstream of the cutting unit 3 there is a motorized rubber-coated roller table 12 which can be lowered relative to the cutting plane of the unit 3. Between the rollers 13 of the roller table 12 there are provided belts 14 advancing in a direction perpendicular to the direction of advancement along the rollers 13, and having the overturning unit 4 provided at their discharge end.

Said overturning unit 4 consists substantially of a rotating shaft 15 provided with four blades 16 at equal angles apart and a semicircular guide 17. Downstream of said overturning unit there is provided a further conveyor comprising belts 18, which extends into a belt 19 for feeding the assembly station 5.

The assembly station 5 comprises a pneumatic pusher 20, an offsetting device 21, a spacer member 22 and an element for achieving rear abutment consisting of a belt conveyor 24 leading to a compactor device 25.

Specifically, the offsetting device 21 comprises two guiding side walls 26 and a plurality of intermediate guides 27 inclined upwards in the direction of advancement of the strips. The number of said guides 27 corresponds to the one half the number of side-by-side strips, the distance between their axes equalling the interaxial distance between three adjacent strips.

The spacer member 22 consists of a plurality of horizontal guides 29 having their entry end connected to the end of the corresponding intermediate guide 27 and being of diverging extension.

Downstream of the compactor device 25 there are provided a gluing press and a belt saw for the continuous panel formed.

It should be noted that the pusher 20, the offsetting device 21, the spacer member 22, the belt conveyor 24 and the compactor device are interposed between the continuous superposed webs representing the upper metal sheet and lower metal sheet 32, 32' with which the panels are formed.

The invention also provides for the use of a plurality of control members, sensors, limit switches and other devices appropriate for the correct functioning of the operating cycle.

All these fall within the normal knowledge of the expert of the art and have therefore not been described or represented, however reference will be made to them during the course of the description of operation.

During the operation of the plant for constructing the panel according to the invention, the piles of mineral wool blankets 2 with their fibres arranged transversely to their longitudinal axis are withdrawn from the store by fork lift trucks and positioned on the conveyor belt 7.

Here the blanket piles are fed one at a time onto the elevator table 8 which rises stepwise through a distance equal to the thickness of a single blnket and for a time sufficient to allow the pusher 9 to push the blanket occupying the upper postion onto the roller advancement system provided in the cutting unit.

During this stage the underlying blanket is prevented from advancing as it rests against a stop member provided in the cutting unit 3.

By passage between the circular saw blades 10 the blanket is divided into strips (ten in the illustrated example) the length and thickness of which correspond to the length and thickness of the starting blanket, their width corresponding to the thickness of the panel to be formed.

Figure 6:
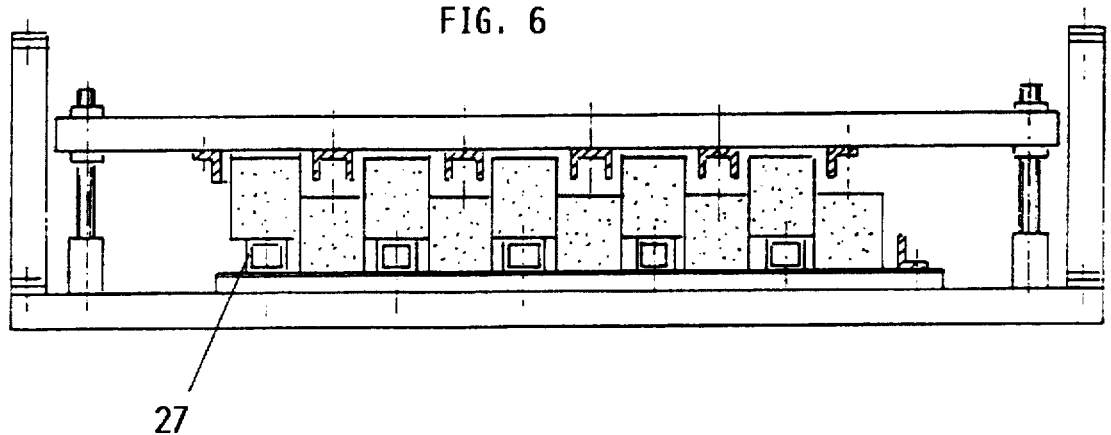
FIG. 6 is an enlarged section therethrough on the line VI—VI of FIG. 2.
Figure 7:
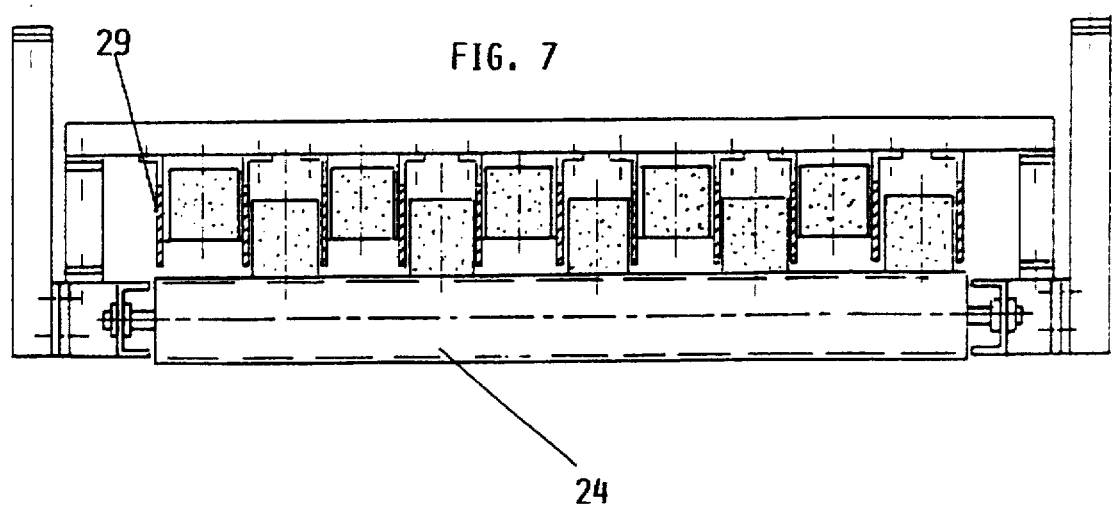
FIG. 7 is an enlarged section therethrough on the line VII—VII of FIG. 2.
Figure 8:
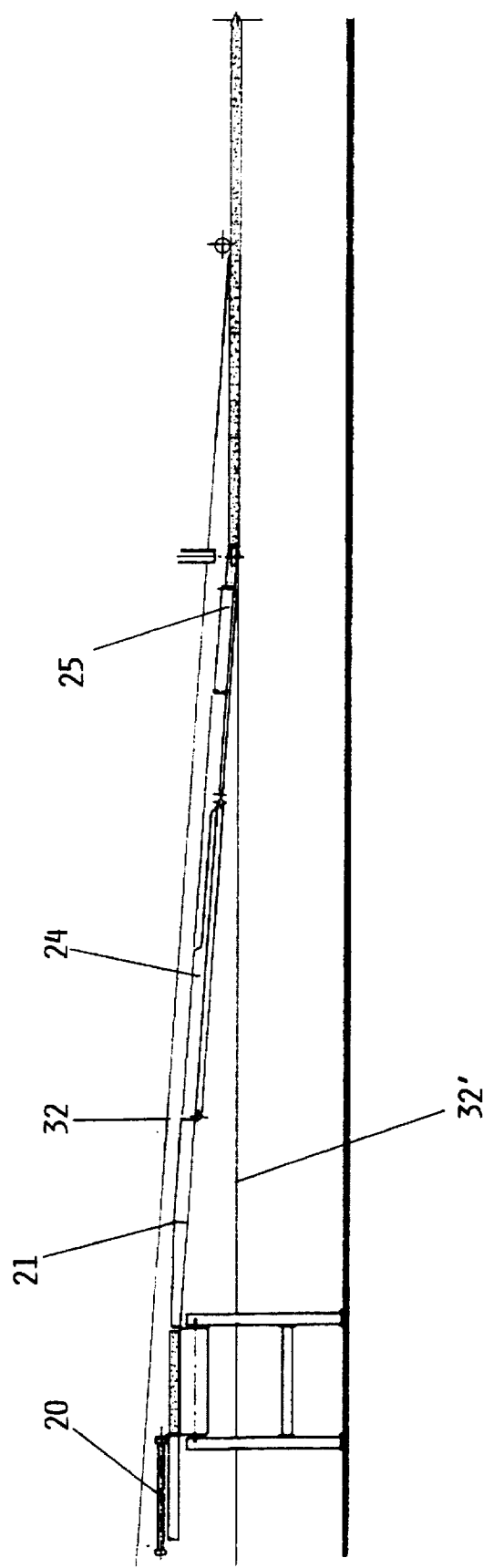
FIG. 8 is a view thereof on the line VIII—VIII of FIG. 2.

The cut strips lying side by side are advanced along the motorized rubber coated roller table 12, at the end of which there is provided an end-of-travel sensor which, when the strips have become positioned on it, causes the roller table 12 to lower so that the strips rest on the belts 14 for their transfer in a direction perpendicular to the preceding towards the overturning unit 4. The strips 6 are brought in succession between the blades 16 of said overturning unit 4 by the advancement of the belts 14 and following 90° rotations become arranged on the conveyor 19 with their fibres orientated upwards. It should be noted that the peripheral velocity of the conveyor belt 19 is equal to the peripheral velocity of the blades of the overturning unit to ensure operational synchronization between the two. The strips 6 are then transferred to the assembly station 5, where they are consolidated in the number corresponding to the width of the panel to be formed, before the pusher 20 inserts them into the offsetting device 21. Here, because of the presence of the inclined intermediate guides 27, each strip is offset vertically relative to the adjacent strips (see FIG. 6) and is then made to diverge from these (see FIG. 7).

Then as a result of the thrust of the strips of the next series of consolidated strips, the strips of the first series are thrust into the spacer 22 along which not only do they maintain their vertical offset but are spaced axially from each other.

At the exit of the spacer 22, the strips are made to advance along the conveyor belt 24 towards the compactor device and during this advancement the strips of the first series are offset longitudinally, either automatically for example by interposing vertically movable stops, or manually for example by means of a suitably shaped template, to hence assume a pseudo-random distribution which is also preserved during passage through the compactor device, before their positioning on the sheet metal web 32'.

As the velocity of the conveyor belt 24 is about double the velocity of advancement of the continuous sheet metal webs, it is apparent that the strips originating from the next blanket move to abut against the rear of the offset strips of the blanket which precedes them, so preserving this pseudo-random distribution.

After this movement to the rear, the pair of lateral compactors 25 bring the spaced and longitudinally offset strips into transverse contact. The continuous blanket which gradually forms is then glued, inserted between the metal sheets 32, 32' and subjected to the action of the press to form a continuous panel, in accordance with traditional methods which do not form part of the invention.

From the aforegoing it is apparent that because of the pseudo-random arrangement of the strips and hence the lack of preferential transverse fracture lines, the panel obtained in accordance with the invention has a greater capacity for supporting the tangential forces arising in flexural stress, hence enabling a structure of greater rigidity to be formed.

The aforedescribed apparatus enables any arrangement of longitudinal strips to be formed, in that once the initial strip configuration has been set, all the subsequent strips abut against the rear without ever losing the initial configuration.

Figure 9:
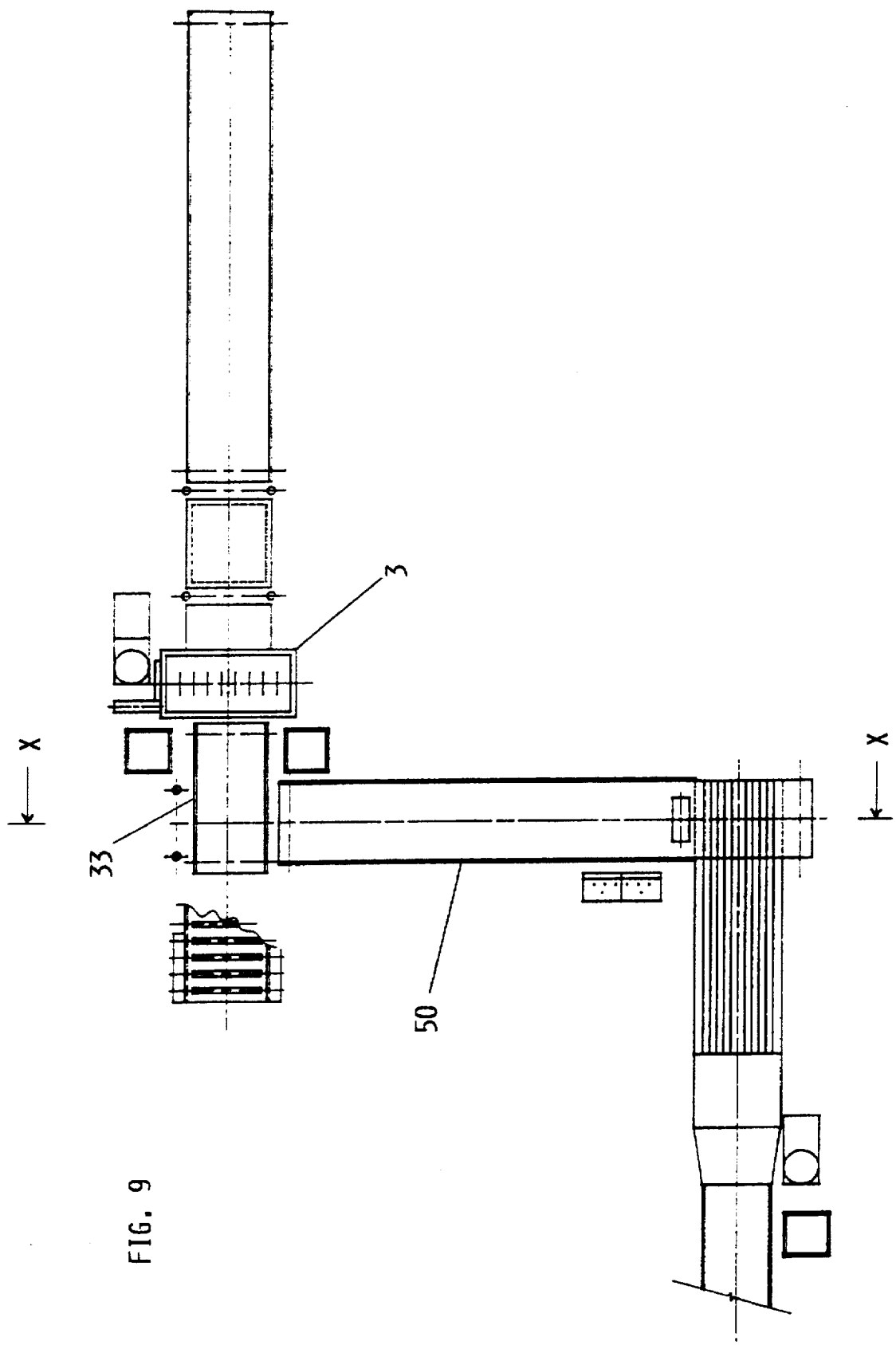
FIG. 9 is a partial plan view of a different plant embodiment.
Figure 10:
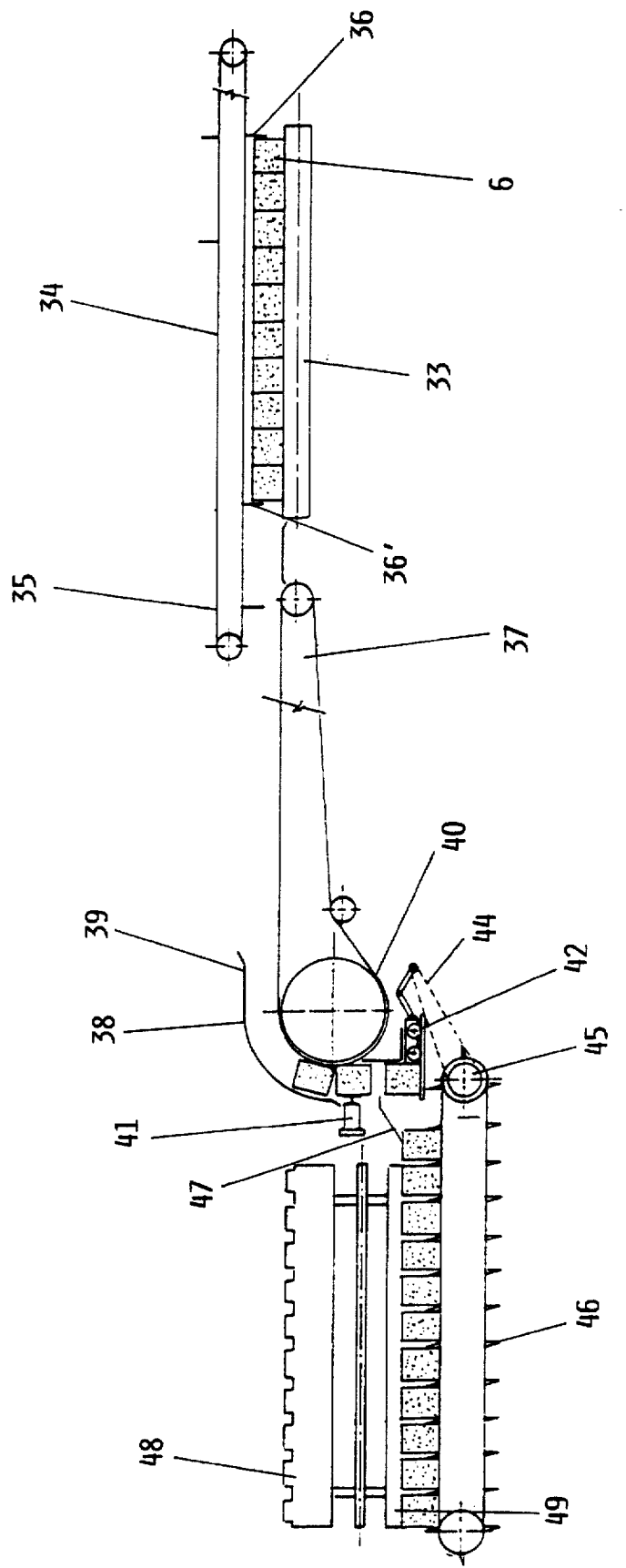
FIG. 10 is an enlarged cross-section therethrough on the line X—X of FIG. 9.

In the embodiment shown in FIGS. 9 and 10 downstream of the cutting unit 3 there is a conveyor belt 33 divided into two sections, the first of which receives the strips 6 leaving the cutting unit, and the second being positioned below a transfer pusher 34. The transfer pusher is mounted above the discharge belt 33 and consists of a pair of chains 35 provided with pusher blades 36 and retaining blades 36'. The distance between the pusher blades 36 of two successive pairs represents the stroke of the pusher and is such as to enable all the strips 6 originating from one and the same blanket to be transferred.

Downstream of the discharge belt there is provided a conveyor/accumulator 36 provided laterally with adjustable guides 50 and positioned slightly inclined upwards with reference to the direction of advancement so as to enable the height necessary for loading an overturning unit 38 to be reached. The velocity of the conveyor 37 is less than that of the chain 35 to prevent undesirable acceleration of the strips.

The overturning unit 38 comprises substantially a sheet metal guide 39 concentric with the conveyor drive roller 40, a presser unit 41 electronically or mechanically synchronized with a pusher unit 42 driven with reciprocating motion by a connecting rod-crank system 43 or tube system operated by a chain 44 rigid with a roller 45 driving a cradle-type introduction unit 46.

The overturning unit 38 also comprises hinged plate 47 interacting with the upper surface of the strips when these are already inserted between the cradles, so as to position them in the correct position even if they have not fallen properly. The presser unit and plates are mounted rigidly on a support which can be adjusted in height depending on the thickness of the panel to be produced.

Above the cradle-type introduction unit 46 there is provided a transfer pusher 48 movable parallel to the longitudinal axis of the strips 6. Said pusher consists of a pair of chains provided with a profiled blade 49 able to penetrate between the cradles of the introduction unit.

During the operation of this second embodiment of the plant, the strips 6 cut by the circular sawblades are urged by the pusher blades 36 into the conveyor/accumulator 37, and following their introduction into the overturning unit 38 the strips become arranged in the seats in the conveyor with their fibres pointing upwards.

During this stage the presser unit retains the second strip of the series of strips accumulated on the belt 37, while the first is inserted into the cradle of the introduction unit. When all the cradles have been filled, the profiled blade 49 of the pusher 48 transfers the strips onto a belt where, as in the preceding example, the strips of the first series are longitudinally offset automatically or manually to assume a pseudo-random distribution. For this purpose the conveyor belt of the rear abutment member is surmouted by a series of parallel guides, the purpose of which is to maintain the strips separated from each other during the abutment stage.

This embodiment has the following advantages over the preceding plant:

a smaller overall size in that the particular shape of the cradle-type conveyor, the purpose of which is to space the strips apart, enables the offsetting device and the spacer member 22 to be eliminated, greater operational reliability of the overturning member, lesser constructional complexity.

I claim:

1. An apparatus for constructing a mineral wool panel comprising a feed station for mineral wool blankets having fibers arranged along a horizontal axis perpendicular to a direction of advancement of said blankets; a cutting unit downstream of said feed station for a single blanket for dividing said single blanket into strips having a width corresponding to a thickness of said panel to be formed, a cutting axis being parallel to said direction of advancement of said blanket; a conveying element for advancing said strips in a direction transverse to said cutting axis; an overturning unit for shifting each strip 90° around its longitudinal axis; an assembling station for said overturned strips, so as to select a suitable number of said strips to form said panel of a desired width; a spacer member for said single strips to align same in a direction of their width; an off-set member placed longitudinally to said strips, so that front ends of said strips are staggered in a pseudo-random fashion; a transverse compactor device for said staggered strips to form a continuous panel; a gluing and a press station for said panel, for formation of a continuous covering sheet; and a cutting unit to cut said panel to a desired length.

2. An apparatus for forming a mineral wool panel as claimed in claim 1, wherein said feed station comprises a belt conveyor for transferring said blanket to an elevator table at an upper end of travel position of which there is provided a pusher for motion toward said cutting unit.

3. An apparatus for forming a mineral wool panel according to claim 1, wherein said cutting unit consists of a multiple circular bladed saw.

4. An apparatus for forming a mineral wool panel according to claim 1, wherein said overturning unit consists substantially of a rotating shaft provided with four blades space 90° apart.

5. An apparatus for forming a mineral wool panel according to claim 1, wherein said spacer member consists of: a plurality of guides inclined upwards in said advancing direction of said strips, said number of said guides corresponding to one-half of the number of said side-by-side strips, the distance between their access equaling an interaxial distance between three adjacent strips; and a corresponding plurality of horizontal guides having their entry end connected to an exit end of said corresponding guides and being of diverging extension.

6. An apparatus for forming a mineral wool panel according to claim 1, wherein said off-set member consists of a movable stop interacting psuedo-randomly with a front end of said strips, during their advancement toward said compactor.

7. An apparatus for forming a mineral wool panel according to claim 1, wherein said conveyor element is divided into two sections, a first section receiving said strips which are leaving said cutting unit, a second section being positioned below a transfer pusher mounted above said conveyor element and provided with pusher blades having their distance corresponding to a complete width of said side-by-side strips.

8. An apparatus for forming a mineral wool panel according to claim 1, wherein said overturning unit comprises a conveyor to an exit end of which a sheet metal guide is provided concentric to a drive roller of said conveyor and which forms a curved channel, said spacer element being provided in a position underlying an exit of such a channel.

9. An apparatus for forming a mineral wool panel according to claim 8, wherein said spacer consists of a cradle-type introduction unit for said strips on which a transfer pusher acts parallel to said longitudinal axis of said strips.

10. A method for forming a mineral wool panel comprising the steps of:

a) longitudinally cutting a mineral wool blanket for form a plurality of an individual series of side-by-side strips, said individual series of side-by-side strips comprised of horizontal fibers which are arranged transverse to their longitudinal axis;

b) advancing said individual series of side-by-side strips in a direction transverse to their longitudinal axis;

c) rotating said individual strips of said series by 90°, wherein a first individual series of side-by-side strips is provided spaced apart in a direction parallel to a direction of advancement;

d) advancing said first series of side-by-side spaced apart strips in a direction parallel to its longitudinal axis;

e) automatically interposing vertically movable stops to longitudinally off-set front ends of said first series of side-by-side strips;

f) laterally compacting said first series of side-by-side strips;

g) fixing said first series of side-by-side strips to a covering sheet; and h) bringing a second series of side-by-side strips into rearward abutment with said first series of strips.

11. A method for forming a mineral wool panel as claimed in claim 10, wherein a shaped template is used to manually off-set said front ends of said first series of side-by-side strips.

12. A method for forming a mineral wool panel comprising the steps of:

a) longitudinally cutting a mineral wool blanket for form a plurality of an individual series of side-by-side strips, said individual series of side-by-side strips comprised of horizontal fibers which are arranged transverse to their longitudinal axis;

b) advancing said individual series of side-by-side strips in a direction transverse to their longitudinal axis;

c) rotating said individual strips of said series by 90°, wherein a first individual series of side-by-side strips is provided spaced apart in a direction parallel to a direction of advancement;

d) advancing said first series of side-by-side spaced apart strips in a direction parallel to its longitudinal axis;

e) separating each strip of said first series of side-by-side strips from adjacent strips to form at least two alternate vertically off-set groups;

f) horizontally separating each strip from said adjacent strips;

g) returning said strips of said at least two alternate vertically off-set groups to a coplanar configuration;

h) automatically interposing vertically movable stops to longitudinally off-set front ends of said first series of side-by-side strips;

i) laterally compacting said first series of side-by-side strips;

j) fixing said first series of side-by-side strips to a covering sheet; and k) bringing a second series of side-by-side strips into rearward abutment with said first series of strips.

* * * * *